(12) United States Patent
Itou et al.

(10) Patent No.: US 7,516,861 B2
(45) Date of Patent: Apr. 14, 2009

(54) CONTAINER MAIN BODY MADE OF SYNTHETIC RESIN AND PREFORMING MOLD DEVICE

(75) Inventors: Koji Itou, Matsudo (JP); Hiroshi Hosokoshiyama, Tokyo (JP); Naoki Tsutsui, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 870 days.

(21) Appl. No.: 10/495,492

(22) PCT Filed: Dec. 18, 2002

(86) PCT No.: PCT/JP02/13211

§ 371 (c)(1),
(2), (4) Date: Jan. 11, 2005

(87) PCT Pub. No.: WO03/051723

PCT Pub. Date: Jun. 26, 2003

(65) Prior Publication Data

US 2005/0103740 A1     May 19, 2005

(30) Foreign Application Priority Data

Dec. 18, 2001   (JP) ............................. 2001-384646

(51) Int. Cl.
*B65D 1/02*  (2006.01)
*B29C 49/06*  (2006.01)

(52) U.S. Cl. .......................... 215/44; 215/45; 425/533

(58) Field of Classification Search ................. 215/40, 215/44, 45, 341, 349; 425/533, 525
See application file for complete search history.

(56) References Cited

U.S. PATENT DOCUMENTS

| | | | | |
|---|---|---|---|---|
| 4,507,258 A | * | 3/1985 | Aoki | 264/255 |
| 4,575,331 A | * | 3/1986 | Dundas et al. | 425/577 |
| 4,813,557 A | * | 3/1989 | Herron et al. | 215/329 |
| 5,020,683 A | * | 6/1991 | Strassheimer | 215/354 |
| 5,788,101 A | * | 8/1998 | King | 215/349 |
| 5,924,586 A | * | 7/1999 | Gregory et al. | 215/350 |
| 6,044,995 A | * | 4/2000 | Dai | 215/354 |
| 6,068,811 A | * | 5/2000 | Koda | 264/537 |
| 6,986,863 B2 | * | 1/2006 | Britton | 264/532 |
| 2003/0001311 A1 | * | 1/2003 | Collette et al. | 264/255 |
| 2003/0098286 A1 | * | 5/2003 | Bloom et al. | 215/349 |

* cited by examiner

*Primary Examiner*—Sue A Weaver
(74) *Attorney, Agent, or Firm*—Oliff & Berridge, PLC

(57) ABSTRACT

It is intended to provide a synthetic resin bottle, in which the stable no-leak condition can be maintained up to a certain cap-turning angle, and air-tightness of the bottle can be fully secured, even if the cap is falsely turned. The body 2 of the synthetic resin bottle is configured to have a smooth seal surface 8 with no irregularity over the entire circumference in the upper portion of the outer neck wall where no parting line is formed. In this configuration, a stable no-leak condition can be maintained up to a certain cap-turning angle, and air-tightness of the bottle can be fully secured, even if the cap is falsely turned.

5 Claims, 8 Drawing Sheets

CONTAINER MAIN BODY MADE OF SYNTHETIC RESIN AND PREFORMING MOLD DEVICE

TECHNICAL FIELD

This invention relates to a synthetic resin bottle having the body molded by the biaxial drawing and blow molding, and to a mold for manufacturing preform, which is to be biaxially drawn and blow molded into the body of this synthetic resin bottle.

BACKGROUND OF THE INVENTION

Beverage bottles such as PET bottles are integrally provided with a tamper-proof ring, which is disposed usually at the lower end of cap skirt and is connected thereto through the breaking pieces that can be broken with the cap movement, so that the bottle can be prevented from being opened falsely in the shop.

This ring has some locking pieces on the inner wall. When the cap is turned in the uncapping direction and is screwed upward from the bottle, a stop ring disposed on the outer wall of the bottleneck blocks the locking pieces. At this point, the ring is prevented from rising, but since the climb of the cap is continued, the breaking pieces between the cap and the ring are broken to separate the cap from the ring. By checking on this separation, one can confirm whether the bottle has already been opened or not.

The cap is provided with a gasket on the inner wall of the cap to enhance air-tightness and to prevent the contents from running out and outside air from flowing into the bottle when the beverage bottle is under the sealed condition. This gasket is made of a properly elastic material and is pushed to the upper surface of the neck due to strong screw engagement between the cap and the bottleneck. Through this tight contact with the top surface of the neck, the gasket seals the opening of the neck.

However, in the case of those caps equipped with a tamper-proof ring, the force of pushing the gasket to the top surface of the neck may become weak with the upward displacement of the cap relative to the bottleneck. This occurs from a point at the limit of screw engagement till the time when the stop ring of the neck blocks the locking pieces of the ring and the breaking pieces start being broken. If a bottle cap is twisted in the shop within a limit in which the breaking pieces are not broken, the bottle looks normal on the exterior. Nevertheless, the sealing function of the gasket is actually in a decreased condition. In this state, the contents tend to be deteriorated, and great anxiety is stirred up in users.

A conceivable means of avoiding this inconvenience is to use the outer wall of the neck of the body as the seal surface. However, when the preform is injection-molded before it is biaxially drawn and blow molded into a bottle, a low, vertical ridge of flash 73 may be formed along the parting line over the entire height of the preform (See FIG. 8). If the outer wall of the neck were covered tightly with a gasket 74, an interstice 75 would be formed on both sides of the flash 73. As a result, the cap would have only a small cap-turning angle to maintain a no-leak condition, and there is a fear that the gasket cannot fully demonstrate its sealing function.

Another means of avoiding the inconvenience is shown in P1999-180458, which discloses that the inner wall of the bottleneck is used as the seal surface. That conventional art discloses a cap equipped with a tamper-proof ring, in which a cylindrical gasket support 54 is suspended from under the gasket 53 and is fitted deeply into the inner wall of the neck of the bottle 51. If the distance of tight contact is made longer between the gasket support 54 and the inner neck wall of the bottle 51, full air-tightness can be maintained even when the cap 52 is turned within a limit in which the breaking pieces 55 are not broken. (See FIG. 7)

However, in the above-described conventional art, the cylindrical gasket support 54 has an outer diameter larger than the bore diameter of the neck so that the gasket support 54 can be tightly fitted into the neck of the bottle 51. In addition, the gasket support 54 is molded so as to have a considerable height. At the time when the cap 52 is screwed on the neck, there may be misalignment on some occasions in the positions of the gasket 53 and the neck of the bottle 51. In that case, the gasket support 54 butts against the top surface of the neck, and then the gasket support 54 in a crooked state may be fitted into the neck, thus creating a problem that no air-tightness is available for the bottle.

This invention has been made to solve the above-described problem. The technical problem is to achieve air-tightness around the entire circumference between the gasket and the upper portion of the outer wall of the bottleneck. An object of this invention is to provide a synthetic resin bottle, in which air-tightness can be fully secured, and stable no-leak condition is maintained, up to a certain cap-turning angle even if the cap is falsely twisted. Another object of this invention is to obtain easily at an inexpensive cost the preform that is biaxially drawn and blow molded into this synthetic resin bottle.

SUMMARY

A means for solving the above-described problem exists in the configurations: that the neck of the bottle is provided with male screw thread, which is spirally raised from the outer wall of the neck; and that the upper portion of the outer neck wall is formed into a smooth seal surface with no irregularity over the entire circumference where no parting line is formed.

An embodiment of the invention may comprise the upper portion of the outer neck wall is formed into a smooth seal surface with no irregularity around the entire circumference where no parting line is formed. Therefore, the seal surface is in tight contact with the cylindrical part of the gasket with no gap around the entire circumference. As a result, the cap seals the bottle stably and strongly.

An embodiment of the invention may also comprise that the outer wall of a peripheral projection is used as the seal surface and that this peripheral projection is disposed in the upper portion of the outer neck wall and stands out laterally at a larger height than the height of the flash that comes out along the parting line.

In at least this embodiment, flash 20 is formed so as to project from the outer wall of the neck 4, as shown in FIG. 6(*i*), then the lower portion of the seal surface 8 cannot be brought to tight contact with the cylindrical portion 18 of the gasket 16 under the influence of the flash, and thus the sealing function of the gasket 16 inevitably decreases. However, if a peripheral projection 19 is disposed at a larger height than the height of flash and if the outer wall of this peripheral projection 19 is used as the seal surface, as shown in FIG. 6(*ii*), then all the seal surface 8 can be brought to tight contact with the cylindrical portion 18 of the gasket 16, and it is possible for the gasket 16 to demonstrate its full sealing function.

An embodiment of the invention may also comprise that the seal surface is designed to have a longer axial length than the axially sealable length of the gasket inside the headed cylindrical cap having female screw thread with which the cap is screwed on the neck of the bottle.

In at least this embodiment, the air-tightness of the bottle is securely maintained up to a certain cap-turning angle, and the bottle can be kept in a stable no-leak condition, even if the cap is falsely turned in the shop. This is because the seal surface is set at a longer axial length than the axially sealable length of the gasket inside the headed cylindrical cap having the female screw thread with which the cap is screwed on the neck of the bottle.

An embodiment of the invention may comprise that the seal surface is designed to have a longer axial length than the climb distance of the cap to be reached up to the time when the tamper-proof ring starts being cut from the cap to which the ring has been integrally connected via the breaking pieces.

In at least this embodiment, the seal of the bottle is securely maintained for a certain climb distance, and a stable no-leak condition can be maintained, even if the cap happens to be twisted falsely in the shop within a limit in which no breaking piece is broken. This is possible because the seal surface is designed to have a longer axial length than the climb distance of the cap to be reached up to the time when the breaking pieces of the tamper-proof ring start being broken.

An embodiment of the invention may also comprise: that a core mold comprises a columnar core having a semi-spherical bottom and is used to form the inner surface of preform, that is, the primary molding of the bottle, and also comprises a flat core plate connected to the upper end of this core; that a cavity mold consists of a pair of split mold halves, and produces the outer shape of the preform; and that the core plate is provided with groove concavity around the upper end of the core, with this concavity having a ring shape as seen in the plan view.

In at least this embodiment, the portion of the preform, which will be used as the seal surface when the preform is biaxially drawn and blow molded into a bottle, can be easily, precisely, and stably molded in a simple configuration that existing core plate is processed to give groove concavity without using a new mold material An embodiment of the invention may also comprise that the periphery of the groove concavity has an outer diameter larger than the bore diameter of the cavity mold at its inner top edge, for a distance of at least the height of flash that comes out along the parting line.

In at least this embodiment, the portion of the preform, which will be used as the peripheral projection when the preform is biaxially drawn and blow molded into a bottle, can be easily, precisely, and stably molded in a simple configuration that the periphery of the groove concavity to be processed on the underside of the core plate has an outer diameter larger than the bore diameter of the cavity mold at its inner top edge, for a distance of at least the height of flash that comes out along the parting line (preferably, twice the flash height or higher).

BRIEF DESCRIPTIONS OF EMBODIMENTS

Figure 6:
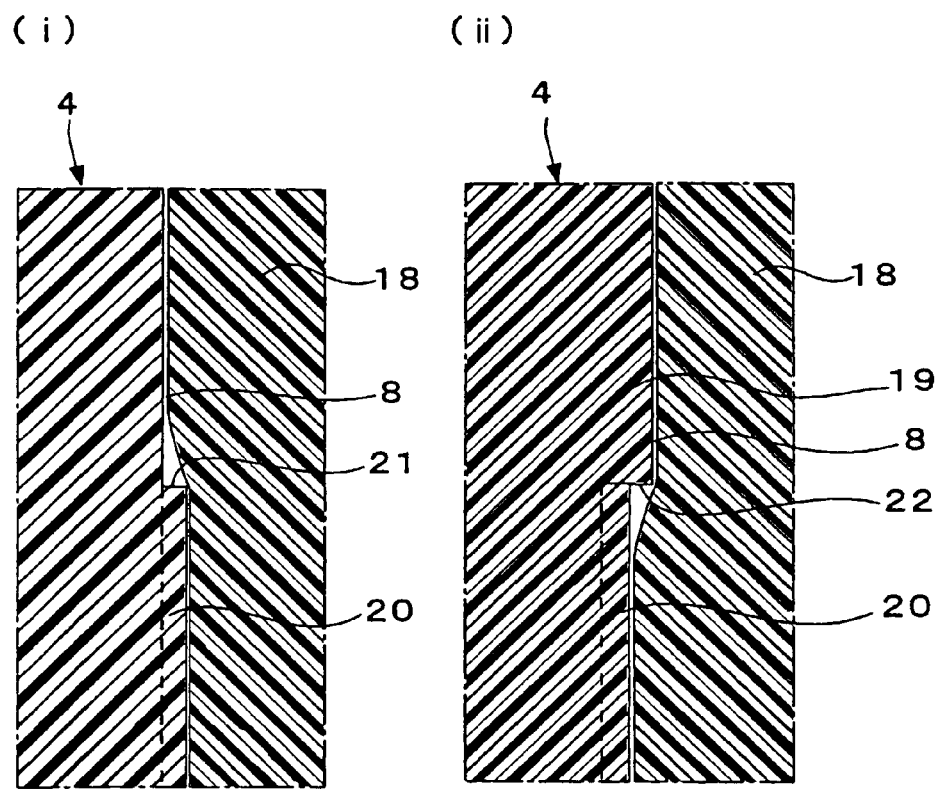

FIGS. 6(i) and 6(ii) are explanatory diagrams in the longitudinal sections showing the relationships between the flash on the parting line and the gasket. FIG. 6(i) shows the first embodiment; and FIG. 6(ii), the second embodiment in which the peripheral projection is provided.

Figure 7:
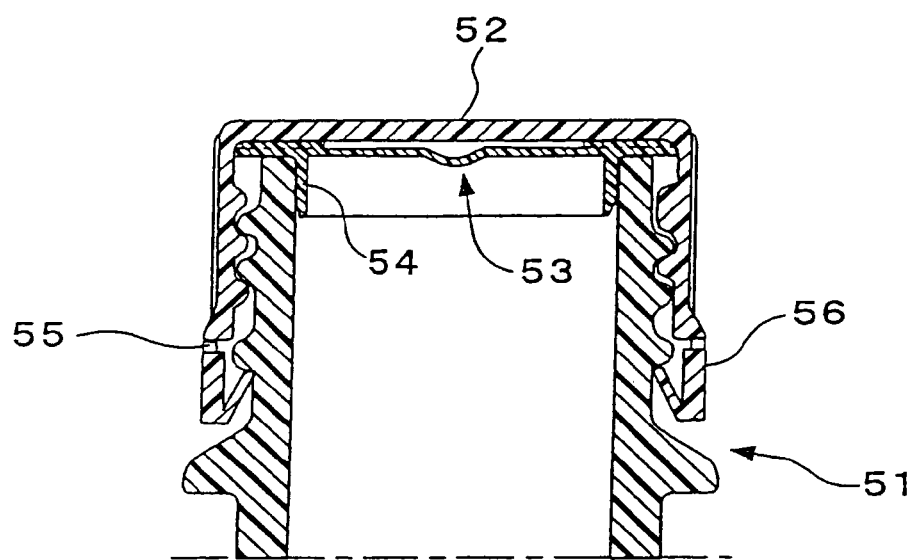

FIG. 7 is a side longitudinal section showing a bottleneck of conventional art.

Figure 8:
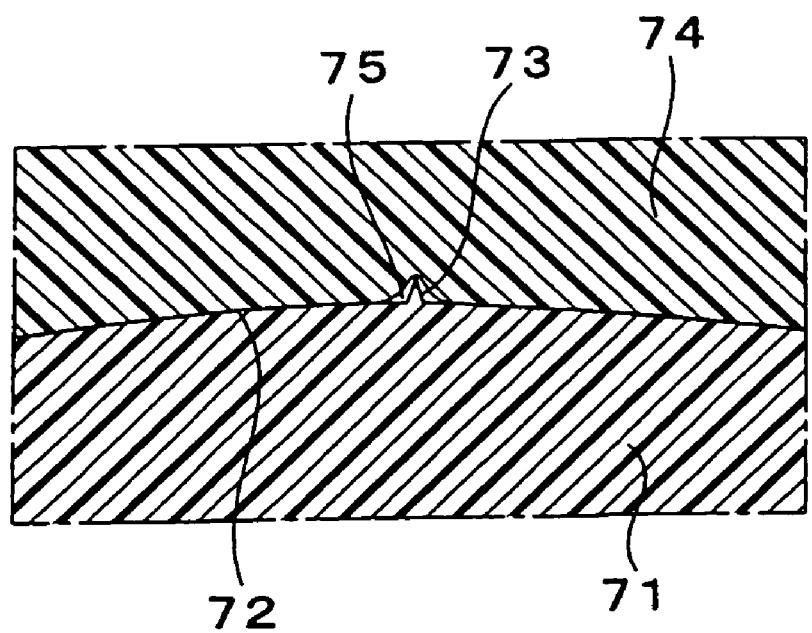

FIG. 8 is an explanatory diagram showing the relationship between the flash and the gasket.

PREFERRED EMBODIMENTS OF THE INVENTION

Figure 1:
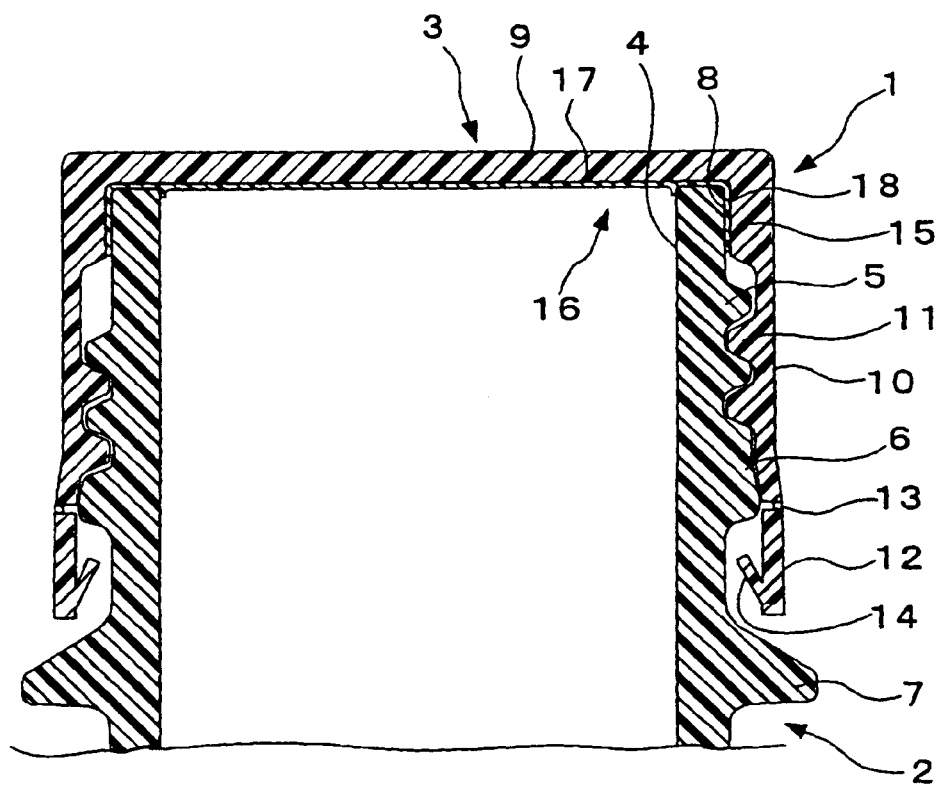
FIG. 1 is a side longitudinal section of the neck of the bottle in the first embodiment of the invention.

FIG. 1 is a longitudinal section showing the neck of the synthetic resin bottle 1 in the first embodiment of the invention, which bottle is a combination of the body 2 and the cap 3. This synthetic resin bottle 1 comprises the body 2 mainly made of polyethylene terephthalate, i.e., a molding biaxially drawn and blow molded and used to contain beverages, and the cap 3 of a headed cylindrical shape, which is injection-molded from mainly an olefin resin, such as polyethylene and polypropylene, and is screwed on the body 2.

The neck 4 of the body 2 is provided, on the outer wall, with the smooth seal surface 8 with no irregularity, where there is no parting line over the entire circumference, and also with the male screw thread 5, the stop ring 6, and the neck ring 7, as described in the order of high to low positions.

The cap 3 is provided with a cylindrical skirt 10, which is suspended from the edge of circular top plate 9. This skirt 10 has the upper portion of its inner wall formed into a thick, gasket-attaching cylinder 15. Female screw thread is spirally raised from the inner wall of the skirt 10 located below this gasket-attaching cylinder 15. The cap 3 is integrally connected to a tamper-proof ring 12 at the lower end of the skirt 10 through the breaking pieces 13 that can be broken as the cap 3 is unscrewed.

This tamper-proof ring 12 is provided with a number of locking pieces 14, which are disposed on the inner wall of this ring 12 and have their tips extending obliquely upward under the condition that the cap 3 has been screwed on the neck 4 of the body 2. These locking pieces 14 are blocked from underside by the stop ring 6.

The gasket 16 made of a soft, elastic material and fixed to the cap 3, and consists of a circular flat portion 17 that covers the entire underside of the top plate 9, and a cylindrical portion 18 that hangs down from the periphery of this flat portion 17 along the inner wall of the gasket-attaching cylinder 15 and is pressed against, and is brought to tight contact with, the seal surface 8 of the neck 4 while the cylindrical portion 18 is supported by the gasket-attaching cylinder 15 under the condition that the cap 3 having a female screw thread 11 has been screwed on the neck 4.

Under the capped condition of the synthetic resin bottle 1, the cylindrical portion 18 of the gasket 16 is supported from outside by the gasket-attaching cylinder 15, and is pressed against, and is brought to tight contact with, the seal surface 8 having no irregularity such as the flash 20. In this state, the seal of the body 2 is secured, and the stable no-leak condition can also be maintained.

When the synthetic resin bottle 1 is opened for the first time, the cap 3 is turned in the unscrewing direction. Thus, the cap 3 goes up, and the locking pieces 14 of the tamper-proof ring 12 reach the lower end of the stop ring 6 and come to a stop. The tamper-proof ring 12 is prevented from going up further, but since the cap 3 continues to go up, the breaking pieces 13 are broken at a point of the climb. As a result, the cap 3 is separated from the tamper-proof ring 12.

Therefore, it is possible for the consumer to check on whether or not the cap 3 is separated from the tamper-proof ring 12 in order to see if the commercial product, a synthetic resin bottle 1, has been falsely opened or not in the shop before they buy one.

Figure 2:
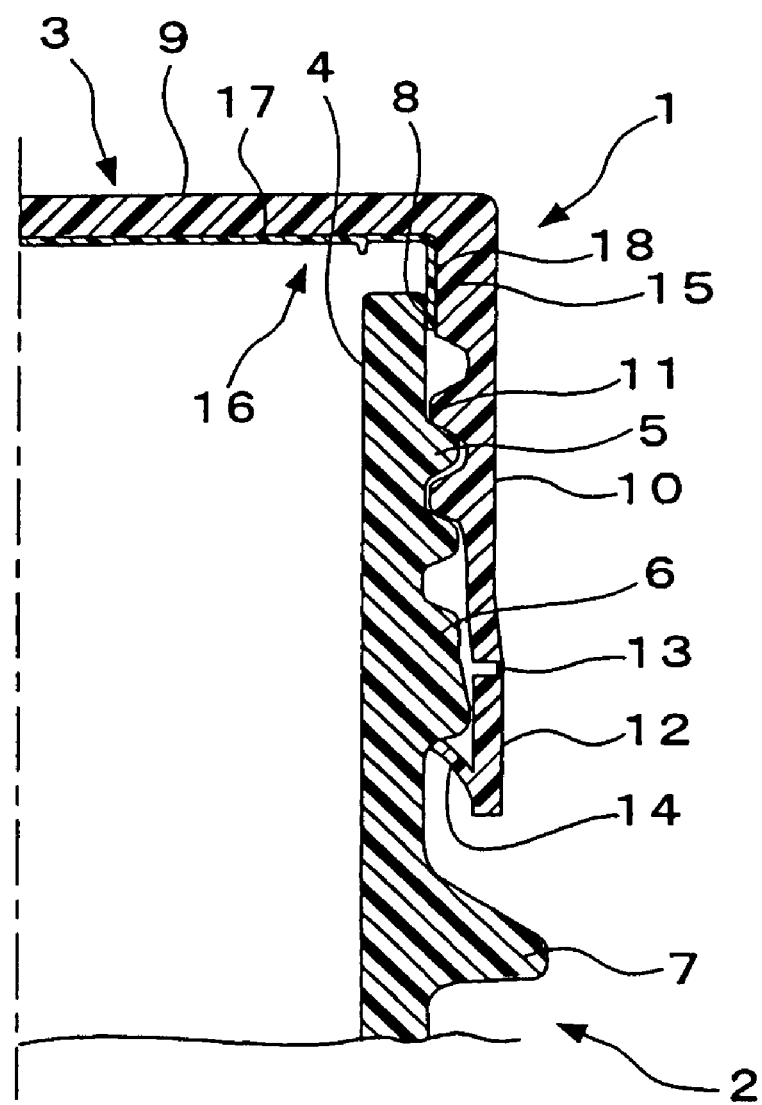
FIG. 2 is a side longitudinal section showing the right half of the neck in the first embodiment shown in FIG. 1, in which the cap has risen to a point just before the breaking pieces are broken.

FIG. 2 shows the cap 3 that has been turned in the unscrewing direction. Even if the cap 3 is falsely turned in the shop within a limit in which the breaking pieces 13 remain unbroken, the gasket 16 is protected against any damage because the seal surface 8 has no irregularity, such as the one caused by flash 20. As a result, the synthetic resin bottle 1 is kept under the airtight condition.

Figure 3:
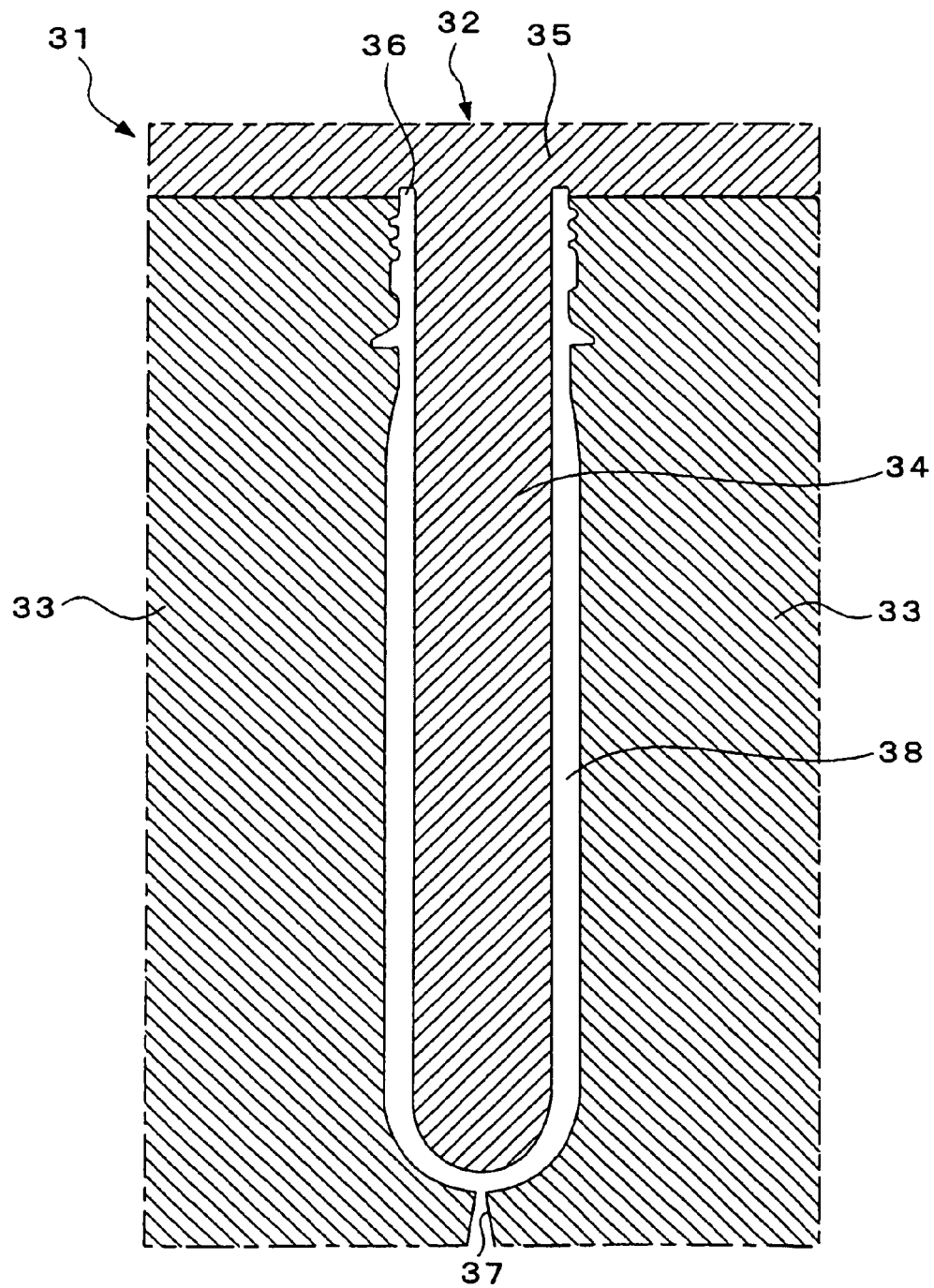
FIG. 3 is a side longitudinal section showing the preform mold in the first embodiment of this invention.

FIG. 3 shows an example of the mold 31 in which to mold the preform to be biaxially drawn and blow-molded into the body 2. The seal surface 8 of this preform with no parting line thereon is disposed on the upper portion of the outer wall of the neck 4, as described in the above embodiment of this invention. FIG. 3 shows the important parts of the mold 31 in which to mold the preform, which is the primary molding of the body 2. The mold 31 comprises a core mold 32 and a cavity mold 33.

The core mold 32 comprises a columnar core 34, which has a semi-spherical end and forms the inner surface of the preform, and a flat core plate 35, which is connected to the base of the core 34. The core plate 35 is provided with a groove concavity 36 around the base of the core 34, and this concavity 36 has a ring shape in the plan view.

The cavity mold 33 consists of a pair of split mold halves, which form the outer shape of the preform. The cavity mold 33 has a gate 37 on the end side.

When preform is injection molded, the core mold 32 and the cavity mold 33 are clamped together to form the cavity 38 in the shape of the preform. Then, a molten synthetic resin material is injected through the gate 37 to mold the preform.

No parting line is formed in the upper portion of the outer wall of the neck 4 because, when the preform neck to be used as the neck 4 of the body 2 is molded, the groove concavity 36 of a ring shape is used to form the periphery of the mouth including the outer neck wall. Therefore, it is not likely that flash 20 comes out along the parting line.

After the injection molding, the preform is released from the mold 31, and is biaxially drawn and blow-molded into the body 2. At that time, the preform neck does not change in shape, and as it is, the preform neck is used as the neck 4 of the body 2. The upper portion of the outer wall near the mouth has no parting line, and is thus used as the seal surface 8 without change.

Figure 4:
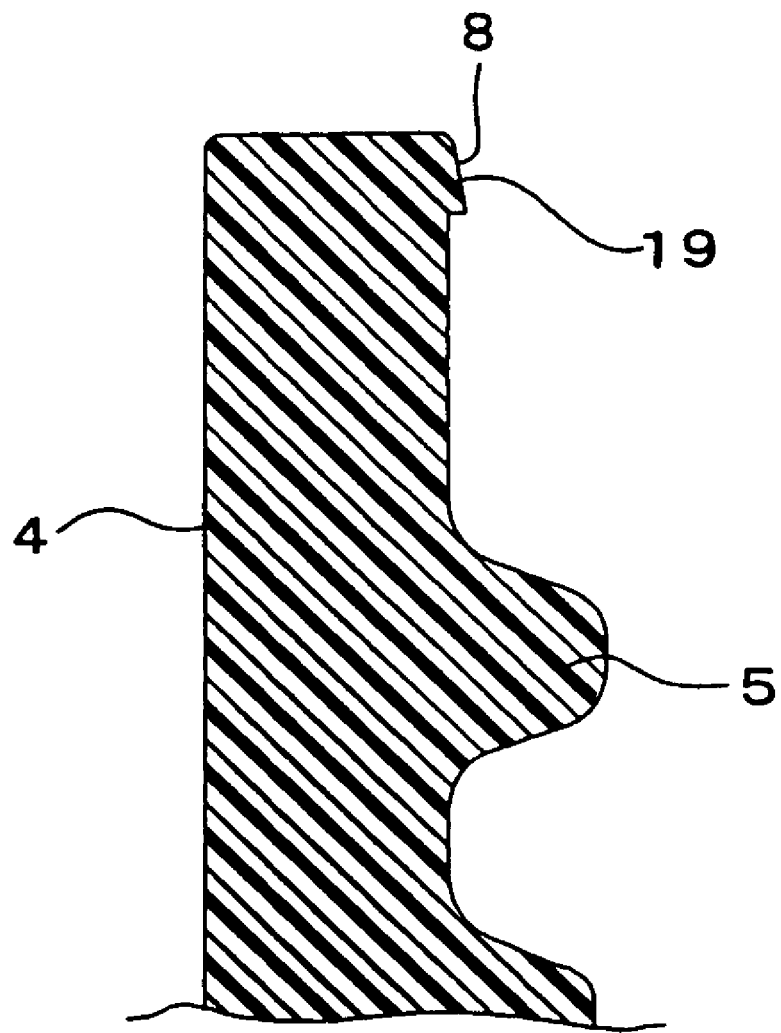
FIG. 4 is an enlarged longitudinal section showing the important portion of the bottleneck in the second embodiment of this invention.

This invention is described with respect to the second embodiment, now referring to FIG. 4.

In the second embodiment of this invention, a peripheral projection 19 is disposed so as to stand out laterally from the outer wall of the neck 4 of the body 2. The outer wall of this peripheral projection 19 has a slope in the upper portion, with the downward slope having a larger diameter in the lower portion than in the upper portion. The rest of the outer wall is used as the seal surface 8.

FIG. 6(*i*) shows the state of contact in the first embodiment of this invention, in which the seal surface 8 is brought to contact with the cylindrical portion 18 of the gasket 16. If flash has been formed as shown, a part of the cylindrical portion 18 is pressed against the flash 20 that has come out, and is partly raised from the seal surface in its lower portion, thus allowing a void to be created. Because of this void, the lower portion of the seal surface 8 has no sufficient sealing function, and there is a possibility that the entire seal surface 8 cannot necessarily be used for effective sealing.

On the other hand, in the second embodiment of this invention, a peripheral injection 19 is disposed in the upper portion of the outer wall of the neck 4, and the outer wall of this peripheral projection is used as the seal surface 8 with an exception of its upper portion. Since the entire seal surface 8 is located outward from the flash 20 as shown in FIG. 6(*ii*), the seal surface 8 is not totally affected by the flash 20, but is brought to strong contact with the cylindrical portion of the gasket 16. As a result, the entire seal surface 8 can be used for effective sealing.

The outer wall of the peripheral projection 19 has a downward slope in the upper portion, with the slope having a larger diameter in the lower portion than in the upper portion. When the cap 3 is screwed on the bottle, the rounded upper portion of the peripheral projection 19 helps the cap 3 to be screwed on the neck 4 safely while preventing the lower end of the cylindrical portion 18 of the gasket 16 from being hooked on the upper edge of the peripheral projection 19 and peeled. Although this downward slope is a preferred shape, it should be noted here that the shape is not limited to such a downward slope, but it is also possible for the peripheral projection 19 to have the shape of a vertical outer sidewall that hangs down from the top flat surface. In addition, a stepped shape is also applicable, instead of the peripheral projection 19 that stands out laterally. In that case, a step or ledge is formed in the upper portion of the outer wall, with the cylindrical portion of the gasket 16 extending down to the step.

Figure 5:
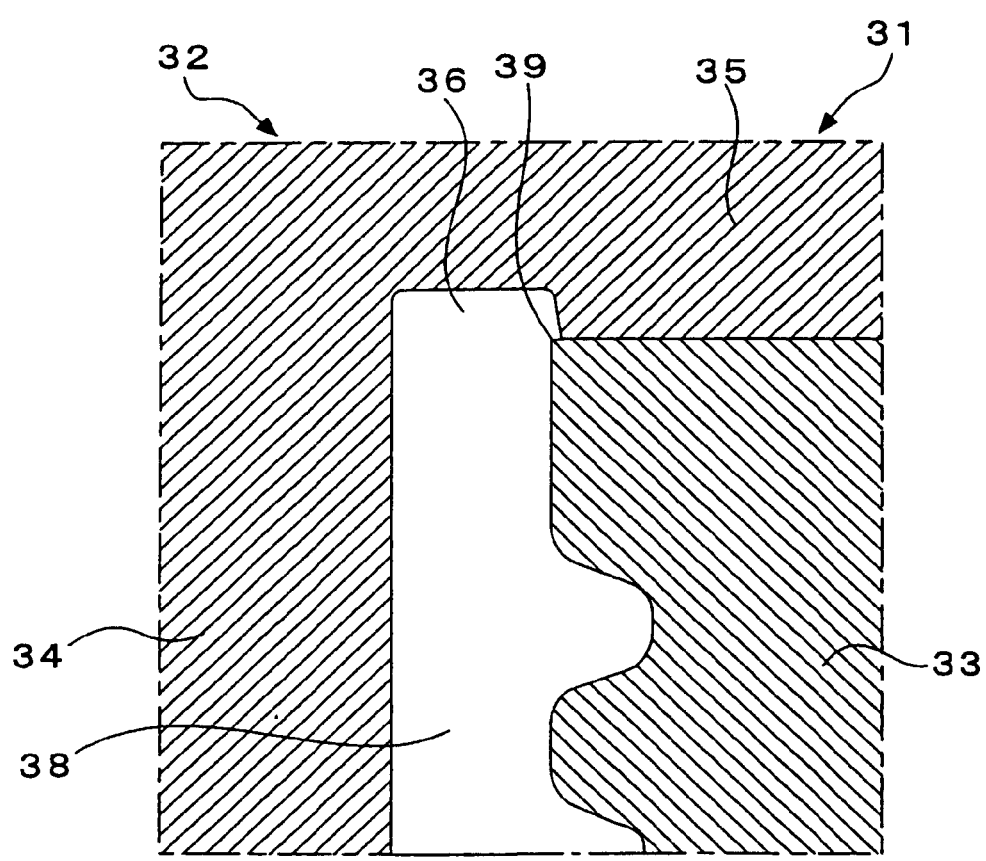
FIG. 5 is a longitudinal section showing the important portion of the preform mold in the second embodiment of this invention.

As shown in FIG. 5, an example of the preform mold is used to mold the preform, which is then biaxially drawn and blow-molded into the body 2 in the second embodiment of this invention. FIG. 5 shows the important portion of the mold 31 for molding the preform, which is the primary molding for the body 2. This mold 31 comprises a core mold 32 and a cavity mold 33. Concerning the core mold 32, the periphery of the groove concavity 36 has an outer diameter larger than the inner top edge 39 at the mouth of the cavity mold 33. The outer wall of the groove concavity 36 has a diameter that widens as the wall goes downward from the groove bottom to the groove mouth.

The groove concavity 36 of the core mold 32 makes up the molded surface at the mouth of the preform neck. Therefore, no parting line is formed on this mouth surface, including the upper portion of the outer wall of the preform neck.

Without any use of an exclusive mold material, it is easy to make up the portion of the mold with which to mold the peripheral projection 19 that has the seal surface 8 on its outer wall, simply by giving a larger diameter to the mouth of the groove concavity 36 than the diameter of the cavity mold 33 at its inner top edge 39.

INDUSTRIAL APPLICABILITY

Embodiments of this invention comprising the above-described configurations have the following effects:

In an embodiment of the invention, the seal surface is smooth with no irregularity because there is no parting line on the surface and thus no possibility of flash development. Therefore, the gasket is never damaged, and the seal surface at the mouth is in tight contact with the cylindrical part of the gasket with no gap around the entire circumference. As a result, the no-leak condition can be maintained up to a certain cap-turning angle even if the cap is turned falsely, and thus air-tightness of the bottle can be fully secured.

In an embodiment of the invention, a stronger, securer seal than ever is achieved by bringing the seal surface to tight contact with the gasket over the entire height so as to bring out the sealing function effectively.

In an embodiment of the invention, the seal of the bottle can be secured up to a certain cap-turning angle, and the stable no-leak condition can be maintained, even if the cap is falsely turned in the shop, because the axial length of the seal surface is set at a length larger than the axially sealable length of the sealing material inside the cap.

In an embodiment of the invention, the seal of the bottle is secured for a certain climb distance of the cap, and the stable no-leak condition can be maintained, even if the cap is falsely turned in the shop within a limit in which no breaking piece is broken. This is because the seal surface is set at an axial length larger than the climb distance of the cap to be reached up to the time when the breaking pieces of the tamper-proof ring start being broken.

In an embodiment of the invention, the portion of the preform, which is used as the seal surface when the preform is molded into a bottle, can be easily and reliably molded and shaped into the preform because of the groove concavity that can be molded in a simple process in which annular concavity is dug into an existing core plate without using a new mold material. The mold cost can be reduced due to the simple process.

In an embodiment of the invention, the portion of the preform, which will be formed into the peripheral projection when the preform is molded into a bottle, can be easily and reliably molded and shaped into the preform because of the groove concavity that can be molded without using a new mold material and in a simple process in which the groove is dug in the existing core plate at such a width that the outer diameter of the groove from the core center has a larger diameter than the bore diameter of the cavity mold at its inner top edge. The cost of the mold equipment can be reduced due to this simple process.

The invention claimed is:

1. A synthetic resin bottle comprising:
a neck having a male screw thread raised spirally around an outer wall of the neck, and having an upper portion formed into a flat, smooth seal surface over an entire circumference of the outer wall of the neck where no parting line is formed; and
a peripheral projection disposed on the outer wall of the neck, wherein
an outer wall of the peripheral projection is used as the seal surface, and wherein
the peripheral projection is disposed on the outer wall of the upper portion of the neck and stands out laterally at a larger height than a height of a flash that comes out along a parting line.

2. The synthetic resin bottle of claim 1, wherein
the seal surface has a longer axial length than an axially sealable length of a gasket inside a headed cylindrical cap having a female screw thread, the cap being screwed on the neck of the bottle.

3. The synthetic resin bottle of claim 2 further comprising:
a tamper-proof ring integrally connected to the cap via breaking pieces, wherein
the seal has a longer axial length than a climb distance of the cap which is reached when the tamper-proof ring begins to detach from the cap.

4. A preform mold comprising:
a core mold which comprises:
a columnar core having a semi-spherical bottom, the columnar core used to forming an inner surface of the preform mold, which is a primary molding of a bottle; and
a flat core plate connected to the root end of the core; and
a single cavity mold comprising a female screw thread and a pair of split mold halves, which produces an outer shape of the preform mold, wherein
the core plate is provided with a groove-like concavity around the root end of the core, the groove-like concavity having a ring shape in the plan view.

5. The preform mold of claim 4, wherein a periphery of the groove-like concavity has an outer diameter larger than a bore diameter of the cavity mold at an inner top edge, for a distance of at least a height of a flash that comes out along a parting line.

* * * * *

UNITED STATES PATENT AND TRADEMARK OFFICE
CERTIFICATE OF CORRECTION

PATENT NO.         : 7,516,861 B2  Page 1 of 1
APPLICATION NO. : 10/495492
DATED                : April 14, 2009
INVENTOR(S)       : Koji Itou et al.

It is certified that error appears in the above-identified patent and that said Letters Patent is hereby corrected as shown below:

On the title page item (54) and col. 1, line 1, delete the following:

"(54) CONTAINER MAIN BODY MADE OF SYNTHETIC RESIN AND PREFORMING MOLD DEVICE"

and replace with:

(54) SYNTHETIC RESIN BOTTLE AND PREFORM MOLD

Signed and Sealed this

Second Day of June, 2009

JOHN DOLL
*Acting Director of the United States Patent and Trademark Office*